ary Examiner—Paul J. Killos
United States Patent [19]
Okonogi et al.

[11] Patent Number: 4,985,246
[45] Date of Patent: Jan. 15, 1991

[54] COMPOSITION OF FEEDSTUFF

[75] Inventors: Shigeo Okonogi, Tokyo; Mamoru Tomita; Seiichi Shimamura, both of Yokohama; Toshio Tomimura, Chiba; Norio Ishibashi, Tokyo; Hiroshi Miyakawa, Kamakura; Koichi Sugawara, Tokyo, all of Japan

[73] Assignee: Morinaga Milk Industry Co., Ltd., Tokyo, Japan

[21] Appl. No.: 924,763

[22] Filed: Oct. 30, 1986

[30] Foreign Application Priority Data

Oct. 31, 1985 [JP] Japan ................................ 60-244799

[51] Int. Cl.$^5$ .............................................. A61K 35/00
[52] U.S. Cl. ................................................... 424/115
[58] Field of Search ......................................... 424/115

[56] References Cited
U.S. PATENT DOCUMENTS 3,655,396 10/1972 Gotto et al. ................................ 99/9

FOREIGN PATENT DOCUMENTS 2542013 9/1984 France .
1539756 1/1979 United Kingdom .
1557390 12/1979 United Kingdom .

OTHER PUBLICATIONS

Ca 102(3): 23237w, 1984.
Ca 105(15): 132427r, 1986.

Primary Examiner—Paul J. Killos
Attorney, Agent, or Firm—Oblon, Spivak, McClelland, Maier & Neustadt

[57] ABSTRACT

A composition of feedstuff containing at least 0.5 wt. %, in solid content, of residual liquid of incubated culture broth of Bifido-bacteria and/or lactic acid bacteria which residual liquid is obtainable as the waste by-product of mass production of living or viable cell mass of the microorganisms by substantially excluding microbial cell mass from the incubated culture broth thereof.

15 Claims, No Drawings

COMPOSITION OF FEEDSTUFF

TECHNICAL FIELD

The present invention relates to a composition of feedstuff for promoting growth of animals, more particularly it relates to a composition of feedstuff containing residual liquid obtainable by filtration or centrifugation of the culture medium in which Bifidobacteria and/or lactic acid bacteria were incubated or solid material dried from the residual liquid. Hereinafter a culture medium in which microorganisms were incubated will be referred to as an incubated culture broth.

BACKGROUND OF THE INVENTION

It has been long-established to utilize fermented products of microorganisms for animal feeds. Utilization of fermented products can be categorized into two types, one is utilization of substances which are produced (decomposed or synthesized) by a specific microorganism and the other is utilization of microbial activities of living cell mass of a specific microorganism.

Japanese Unexamined Patent Application Gazette No. 57(1982)-206342 discloses a composition of feedstuff for red sea-bream (*Perciformes pagrus*) containing fermented products of *Phaffia rhodozyma* belonging to yeast. The term "fermented products" in this reference means fermented culture broth microbial cell mass collected therefrom, substances obtainable by physically destroying or chemically decomposing microbial cells. Said microorganisms produce a red pigment, astaxanthin, which is effective for color development in epidermis of red sea-bream and which is accumulated inside cells, thus it is expressly described in said reference that when fermented culture the broth is used it is essential to include microbial cell mass therein.

Japanese Examined Patent Application Gazette No. 57(1982)-39153 discloses an animal feed supplement containing fermented products of *Streptomyces eurocidicus* variety asterocidicus belonging to the Class Actinomycetes. The terms "fermented products" in this reference mean fermented culture broth or its concentrated liquid including or excluding microbialcell mass thereof, dried materials obtainable therefrom, and wet or dried microbial cell mass collected therefrom. That is, the invention in this reference utilizes the substances which are produced by said microorganisms and which are included inside and outside microbial cells thereof.

Japanese Unexamined Patent Application Gazette No. 50(1975)-68867 discloses animal feed containing fermented products of yeast belonging to *Sacchalomyces cerevisiae* which products is effective for reducing serum cholesterol. The terms "fermented products" used in said reference include fermented culture broth including or excluding microbial cell mass, since the invention in this reference utilizes the substance which is produced outside microbial cells.

Japanese Unexamined Patent Application Gazette No. 56(1981)-58491 discloses an immuno-activating substance having anti-tumor function which is isolated and purified from the filtrate of incubated culture broth of microorganisms belonging to the genus Bifidobacterium. In this reference the filtrate of incubated culture broth in which a strain of microorganisms belonging to the genus Bifidobacterium is anaerobically incubated is physico-chemically fractionated to obtain effective substances having molecular weights within a certain range.

Animal feedstuff containing viable or living cell mass of lactic acid bacteria which are useful bacteria dwelling in the animal intestine and which serve initiation or conservation of favorable intestinal flora is known. For example, animal feed containing incubated culture broth including living or viable cell mass of lactic acid bacteria and supplement to be added to animal feeds consisting of powdery material dried from the incubated culture broth containing viable microbial cell mass of lactic acid bacteria have been commercially available.

In recent years, antibiotics have been widely utilized in live-stock industry. Minute amounts in the ration has proved to increase the growth of animals. Repetitive administration of antibiotics, however, entails some problems. One of the problems is undesirable influences to the human health caused by the antibiotics which can be transferred into live-stock products such as meat and eggs. Another problem is that repetitive administration may cause disturbance of normal intestinal flora and may cause in turn decline of defense against microbial infections to animals.

In order to solve the latter problem, it has been attempted to feed living or viable cell mass of useful bacteria dwelling in animal intestine for reestablishment of normal intestinal flora. However, it cannot be expected that the useful bacteria are settled and propagated in animal intestin when antibiotics are concurrently administered, since such bacteria are susceptive to antibiotics without exception.

As will be clear from the forgoings, there has not been known a composition of animal feed containing the residual liquid of incubated culture broth obtainable by substantially excluding microbial cell mass of Bifidobacteria and/or lactic acid bacteria from the incubated culture broth or solid material dried from the residual liquid.

The inventors of the present invention have discovered as the result of their effort that the residual liquid of incubated culture broth excluding microbial cell mass of Bifidobacteria and/or lactic acid bacteria has an excellent effect as a growth-promotong supplement for animal feeds. The present invention is based on this discovery.

SUMMARY OF THE INVENTION

Accordingly, it is an object of the present invention to provide a composition of feedstuff which can be fed to various animals not only commercial animals such as cattle, swine, chickens and eels, but also pet animals such as dogs and cats.

It is another object of the present invention to provide a composition of feedstuff containing the residual liquid of incubated culture broth which is nutritious and effective for promoting the growth of animals and which is obtainable as the heretofore wasted by-product produced in the in mass production of living or viable cell mass of Bifidobacteria and/or lactic acid bacteria.

It is a further object of the present invention to provide growth-promoting feedstuff composition for animals at an extremely low cost.

According to the present invention, a composition of feedstuff is prepared by adding to conventional feedstuff the residual liquid of incubated culture broth of Bifidobacteria and/or lactic acid bacteria at least 0.50 wt. % in its solid content or its dried dried material.

The residual liquid is obtainable by substantially excluding microbial cell mass from the incubated liquid culture broth. The residual liquid can be added in the form of liquid or solid to feeds for various animals inclusive of mammals and fish. The thus obtained composition of feedstuff found to be highly nutritious, to be preferred by wide variety of animals and to be effective for promoting animal growth. Moreover the composition of this invention can be provided at extremely low cost, since the residual liquid of incubated culture broth is obtainable as the waste by-product of large scale cultivation of Bifidobacteria and/or lactic acid bacteria.

DETAILED DESCRIPTION OF THE INVENTION

Any known strains of microorganisms belonging to the genus Bifidobacterium can be used in this invention, for example, *Bifidobacterium bifidum, B. longum, B. pseudolongum* and so on.

Also any known strains of microorganisms belonging to the genus Lactobacillus such as *Lactobacillus bulugaricus, L. casei, L. acidophilus* and so on and any known strains of microorganisms belonging to the genuses classified to lactic-acid forming cocci such as the genuses of Streptococcus, Pediococcus, Leuconostoc and so on can be used.

Culture broth is preferably synthetic or semi-synthetic and enables to collect microbial cell mass by centrifugal method or dialysis incubation method.

Bulk starter of Bifidobacteria or lactic acid bacteria is added to a suitable culture broth, and incubated by a conventional method under proper condition and the microbial cell mass is excluded. The thus obtained residual liquid of the incubated culture broth or its dried material is added to any known basic feeds in the ratio of 0.5 wt. % in its solid content of the former to the latter.

The residual liquid of incubated culture broth used in this invention is rich in valuable metabolic substances produced by Bifidobacteria and/or lactic acid bacteria, for example, amino acids such as glutamic acid, lysin, plorine; vitamins such as vitamin $B_2$, vitamin $B_6$, nicotinic acid amide (nicotinamide).

Thus the composition of feedstuff in accordance with the present invention is excellent in the view points of dietetics and physiology. Furthermore the composition of feedstuff of this invention is well suited to be added to animal feed containing antibiotics, since the residual liquid of incubated culture broth do not include living or viable microbial cell mass. Still further the present invention has economical significance, since the residual liquid of incubated culture broth can be obtained as the waste by-product of the cultivation of Bifidobacteria and/or lactic acid bacteria on the scale of mass production.

Having explained the general aspects of the present invention, now several tests exemplifying the effectiveness of the feedstuff composition in accordance with the present invention will be described hereunder.

It should be noted that specific microbial strains deposited to the competent depositories are used in the tests for eliminating troublesome jobs, for example collection of microorganisms from a suitable source, isolation and identification of the aimed bacteria and incubation of the identified bacteria and so on, but as previously stated, any known strains can be used as far as they belong to the genuses previously referred to.

TEST 1

Bulk starter culture of *Bifidobacterium adolescentis* (ATCC No. 15703) was added to the culture medium having a composition listed hereunder and adjusted its pH to 6.8 and then incubated at 40° C. for 16 hours.

| Composition of Culture Medium | |
|---|---|
| yeast extract | 1.0% |
| meat extract | 1.5% |
| casitone | 1.0% |
| potassium phosphate | 0.1% |
| potassium phosphate, dibasic | 0.1% |
| sodium acetate | 0.7% |
| lactose | 3.0% |
| cystine | 0.04% |

After incubation, the acidity of the incubated culture broth was neutralized by adding 30% sodium hydroxide aqueous solution, then microbial cell mass was substantially removed by centrifugation at 5,000 r.p.m. for 15 minutes to obtain the supernatant liquid of the incubated culture broth.

The thus obtained residual liquid was added in the ratio of 0.25 wt. %, 0.50 wt. %, 0.75 wt. % and 1.00 wt. % in solid content respectively to dried assorted feed in substitution for milk for suckling calves to prepare 4 kinds of test samples. The composition of said assorted substitutional feed for milk was as follows:

| Composition of Assorted Substitutional Feed for Milk | |
|---|---|
| skim milk | 60.0% |
| dried whey | 14.8% |
| animal fat | 20.0% |
| fish soluble | 4.0% |
| mixture of vitamins | 0.5% |
| mixture of minerals | 0.7% |
| in total | 100.0% |

For comparison, comparative sample No. 1 which consists of the assorted feed only and comparative sample No. 2 which consists of 6 ml of commercially available feed additive comprising incubated culture broth including living microbial cell mass of lactic acid bacteria and 1 Kg of said dried assorted feed in accordance with the instruction attached therewith were prepared.

The prepared samples were fed to healthy Holstein male calves of 7-10 days-old. More particularly, 12 calves were grouped into 6 groups each consisting of two calves and raised for 4 weeks paying thoughtful consideration to ventilation, lighting and keeping-warm in a cow-shed during which period respective samples diluted into 5 times quantities with water were given 3 times a day to the respective groups of calves by 3 l per a calf at each time allowing them to take freely. In addition to the samples, 200 g of hay and 200 g of assorted feed for suckling calves consisting of following composition were given allowing to take it in their own way.

| Composition of Assorted Feed for Suckling Calves | |
|---|---|
| corn(maiz) | 51.0% |
| oil meal of soy bean | 32.0% |
| Alfalfa meal | 5.0% |
| molasses | 10.0% |
| salt | 1.0% |
| calcium phosphate, tribasic | 1.0% |
| oxytetracycline | 50 mg/Kg |

-continued

| Composition of Assorted Feed for Suckling Calves | |
|---|---|
| in total | 100.0% |

Plenty of water was also given allowing them to drink it ad libitum.

Total quantity of feeds taken by each calf was measured every day, and total quantity of feeds taken by each calf during 4 weeks raising period and mean quantity of feeds taken by each calf per a day were calculated. Body-weight of each calf was also measured at 2 weeks and at 4 weeks after commencing the test, and increased weight, increasing ratio of weight, mean increasing weight per a day and feed efficiency (increased weight per 1 Kg of feeds taken by each calf) for each calf were calculated and compared to those values on other calves. The results are shown in Tables 1–3.

TABLE 1

| quantity added* | identification No. of animals | weight before test (Kg) | items to be measured | after 2 weeks | after 4 weeks | mean value |
|---|---|---|---|---|---|---|
| 0.25% | 1 | 51.4 | weight measured (Kg) | 60.5 | 70.2 | 65.35 |
| | | | increased weight (Kg) | 9.1 | 9.7 | 9.4 |
| | | | increasing rate of weight (%) | 17.8 | 16.0 | 16.9 |
| | | | mean increased weight/day (Kg) | 0.65 | 0.69 | 0.67 |
| | 2 | 46.0 | weight measured (Kg) | 54.5 | 65.6 | 60.55 |
| | | | increased weight (Kg) | 8.5 | 10.1 | 9.3 |
| | | | increasing rate of weight (%) | 18.5 | 18.0 | 18.25 |
| | | | mean increased weight/day (Kg) | 0.61 | 0.72 | 0.67 |
| 0.50% | 3 | 50.8 | weight measured (Kg) | 61.0 | 72.0 | 66.5 |
| | | | increased weight (Kg) | 10.2 | 11.0 | 10.6 |
| | | | increasing rate of weight (%) | 20.1 | 18.3 | 19.2 |
| | | | mean increased weight/day (Kg) | 0.73 | 0.79 | 0.76 |
| | 4 | 45.5 | weight measured (Kg) | 54.8 | 66.8 | 61.3 |
| | | | increased weight (Kg) | 9.3 | 11.0 | 10.7 |
| | | | increasing rate of weight (%) | 20.4 | 19.7 | 20.05 |
| | | | mean increased weight/day (Kg) | 0.66 | 0.79 | 0.73 |
| 0.75% | 5 | 47.7 | weight measured (Kg) | 58.3 | 69.6 | 63.95 |
| | | | increased weight (Kg) | 10.6 | 11.3 | 11.0 |
| | | | increasing rate of weight (%) | 22.2 | 18.9 | 20.55 |
| | | | mean increased weight/day (Kg) | 0.76 | 0.81 | 0.79 |
| | 6 | 49.1 | weight measured (Kg) | 59.9 | 71.5 | 65.7 |
| | | | increased weight (Kg) | 10.8 | 11.6 | 11.2 |
| | | | increasing rate of weight (%) | 22.0 | 19.4 | 20.7 |
| | | | mean increased weight/day (Kg) | 0.77 | 0.83 | 0.80 |
| 1.00% | 7 | 44.5 | weight measured (Kg) | 53.6 | 66.3 | 59.95 |
| | | | increased weight (Kg) | 9.1 | 11.5 | 10.3 |
| | | | increasing rate of weight (%) | 20.4 | 21.0 | 20.7 |
| | | | mean increased weight/day (Kg) | 0.65 | 0.82 | 0.74 |
| | 8 | 52.6 | weight measured (Kg) | 63.1 | 76.3 | 68.7 |
| | | | increased weight (Kg) | 10.5 | 13.2 | 11.85 |
| | | | increasing rate of weight (%) | 20.0 | 20.9 | 20.45 |
| | | | mean increased weight/day (Kg) | 0.75 | 0.80 | 0.78 |
| not added (comparative sample No.1) | 9 | 47.2 | weight measured (Kg) | 56.3 | 65.7 | 61.0 |
| | | | increased weight (Kg) | 9.1 | 9.4 | 9.3 |
| | | | increasing rate of weight (%) | 19.3 | 16.7 | 18.0 |
| | | | mean increased weight/day (Kg) | 0.65 | 0.67 | 0.66 |
| | 10 | 50.3 | weight measured (Kg) | 59.7 | 69.6 | 64.65 |
| | | | increased weight (Kg) | 9.4 | 9.9 | 9.7 |
| | | | increasing rate of weight (%) | 19.7 | 16.6 | 18.15 |
| | | | mean increasedweight/day (Kg) | 0.67 | 0.71 | 0.69 |
| 6 ml (comparative sample No.2) | 11 | 49.5 | weight measured (Kg) | 59.3 | 69.5 | 64.4 |
| | | | increased weight (Kg) | 9.8 | 10.2 | 10.0 |
| | | | increasing rate of weight (%) | 19.8 | 17.2 | 18.5 |
| | | | mean increased weight/day (kg) | 0.70 | 0.73 | 0.72 |
| | 12 | 48.0 | weight measured (Kg) | 57.6 | 67.6 | 62.6 |
| | | | increased weight(Kg) | 9.6 | 10.0 | 9.8 |
| | | | increasing rate of weight (%) | 20.0 | 17.4 | 18.7 |
| | | | mean increased weight/day (Kg) | 0.69 | 0.71 | 0.70 |

*percentage of the residual liquid of incubated culture broth or quantity of commercially available feed additive added to test samples or comparative samples

TABLE 2

| quantity added* | identification No. of animals | mean quantity of feeds taken | | total |
|---|---|---|---|---|
| | | during 2 weeks | during 2–4 weeks | |
| 0.25% | 1 | 0.95 | 1.46 | 33.7 |
| | 2 | 0.93 | 1.46 | 33.5 |
| 0.50% | 3 | 1.02 | 1.51 | 35.4 |
| | 4 | 0.95 | 1.52 | 34.6 |
| 0.75% | 5 | 0.99 | 1.57 | 35.8 |
| | 6 | 1.03 | 1.61 | 37.0 |
| 1.00% | 7 | 0.92 | 1.49 | 33.7 |
| | 8 | 1.09 | 1.70 | 39.1 |
| not added (comp. sample No.1) | 9 | 0.94 | 1.46 | 33.6 |
| | 10 | 0.97 | 1.49 | 34.4 |
| 6 ml | 11 | 0.97 | 1.56 | 35.4 |

TABLE 2-continued

| quantity added* | identification No. of animals | mean quantity of feeds taken | | |
|---|---|---|---|---|
| | | during 2 weeks | during 2-4 weeks | total |
| (comp. sample No.2) | 12 | 0.96 | 1.54 | 35.0 |

*percentage of the residual liquid of incubated culture broth or quantity of commercially available feed additive added to test samples or comparative samples

TABLE 3

| quantity added* | ident. No. of animals | feed efficiency |
|---|---|---|
| 0.25% | 1 | 0.56 |
| | 2 | 0.56 |
| 0.50% | 3 | 0.60 |
| | 4 | 0.59 |
| 0.75% | 5 | 0.61 |
| | 6 | 0.61 |
| 1.00% | 7 | 0.61 |
| | 8 | 0.61 |
| not added | 9 | 0.55 |
| (comp. sample No.1) | 10 | 0.56 |
| 6 ml | 11 | 0.56 |
| (comp. sample No.2) | 12 | 0.56 |

*percentage of the residual liquid of incubated culture broth or quantity of commercially available feed additive added to test samples or comparative samples As will be seen from Tables 1-3, calves (identification Nos. 3-8) which were fed test samples containing 0.50%, 0.75% and 1.00% in solid content of the residual liquid showed remarkable results in each of test items, increasing rate of weight, mean increased weight per a day and feed efficiency.

It can be noted in Table 2 that total quantity of feed taken by calves (identification Nos. 4 and 7) which were fed the residual liquid were not so large or rather slightly small than those taken by calves (identification Nos. 9 and 10) which were not fed the residual liquid. This is because that at the beginning of the test the weights of calves Nos. 4 and 7 were fairly smaller than those of calves Nos. 9 and 10. As seen from Table 3, however, feed efficiency on calves Nos. 4 and 7 were clearly higher than those on calves Nos. 9 and 10.

Also excellent results were observed on calves Nos. 3-8 to which the residual liquid was fed comparing with the calves Nos. 11 and 12 to which commercially available feed additive consisting of incubated culture broth containing microbial cell mass was fed.

It will be noted that significant differences in test items were observed between test samples containing 0.50%, 0.75% and 1.00% in solid content of the residual liquid, whereas a significant difference was not observed between test samples containing 0.75% and 1.00% in solid content of the residual liquid respectively. Furthermore, feed efficiency of test sample containing 0.25% of the residual liquid (fed to calves Nos. 1 and 2) was equal to that of comparative sample containing commercially available feed additive (fed to calves Nos. 11 and 12) and the results in the remaining test items of the former were rather lower than those of the latter.

In view of the forgoings it has been concluded that when the residual liquid of incubated culture broth of B. adolescentis (ATCC No. 15703) is added to feed, addition of 0.50 wt. % in solid content or more of the residual liquid is effective and addition of 1.00 wt. % in solid content of the same is upper limit.

Similar results were observed in similar tests which were carried out using many other strains of various species of Bifidobacteria and lactic acid bacteria.

TEST 2

Bulk starter culture of Lactobacillus helveticus (NCDO No. 30) was added to the culture medium having the composition listed hereunder and adjusted its pH to 6.8 and then incubated at 40° C. for 16 hours.

| Composition of Culture Medium | |
|---|---|
| yeast extract | 1.0% |
| meat extract | 1.5% |
| peptone | 1.0% |
| potassium phosphate | 0.1% |
| potassium phosphate, dibasic | 0.2% |
| sodium acetate | 0.5% |
| lactose | 3.0% |
| cysteine | 0.04% |

After incubation, incubated culture broth was neutralized by adding 30% sodium hydroxide aqueous solution, then microbial cell mass was substantially removed by centrifugation at 5,000 r.p.m. for 15 minutes to obtain the supernatant fluid of incubated culture broth. The thus obtained residual liquid was concentrated by a vacuum concentrator so as to reduce water content from 95 wt. % to 80 wt. %, then subjected to freeze drying to obtain dried powder. The resulted powder was added to assorted artificial milk feed for young swine having the composition listed hereunder in the ratios of 0.25 wt. %, 0.50 wt. %, 0.75 wt % and 1.00 wt. % respectively to obtain 4 kinds of test samples.

| Composition of Assorted Artificial Milk Feed | |
|---|---|
| corn (maiz) | 24.5% |
| wheat bran | 4.0% |
| sugar | 5.0% |
| defatted rice-bran | 6.0% |
| barley | 13.4% |
| soya bean cake | 14.7% |
| fish meat powder | 7.5% |
| dried beer yeast | 2.0% |
| whey powder | 10.0% |
| wheat | 10.0% |
| calcium carbonate | 0.4% |
| calcium phosphate, dibasic | 0.9% |
| salt | 0.5% |
| mixture of minerals | 0.1% |
| mixture of vitamins | 1.0% |
| in total | 100.0% |

For comparison, comparative sample No. 3 which consists of 0.20 wt. % of commercially available feed supplement consisting of incubated culture broth containing microbial cell mass of lactic acid bacteria and said assorted artificial milk feed, comparative sample No. 4 which consists of 0.50 wt. % of said commercially available feed additive and said assorted artificial milk feed and comparative sample No. 5 which consists of said assorted feed containing artificial milk only were prepared.

The prepared samples were fed to Landrace mail shoats of one month-old. More particularly, 14 shoats were grouped into 7 groups each consisting of two shoats and raised for 4 weeks paying thoughtful consideration to ventilation, lighting and keeping-warm in a pig-shed during which period plenty amount of respective samples were fed 3 times a day to respective groups of shoats allowing them to take it their own way. Plenty of water was also given allowing them to drink it ad libitum.

In the same way as in Test 1, same test items were measured and calculated. The results are shown in Tables 4–6.

TABLE 4

| quantity added* | identification No. of animals | weight before test (Kg) | items to be measured | after 2 weeks | after 4 weeks | mean value |
|---|---|---|---|---|---|---|
| 0.25% | 13 | 9.3 | weight measured (Kg) | 15.2 | 22.1 | 18.65 |
| | | | increased weight (Kg) | 5.9 | 6.9 | 6.4 |
| | | | increasing rate of weight (%) | 63.4 | 45.4 | 54.4 |
| | | | mean increased weight/day (Kg) | 0.42 | 0.49 | 0.46 |
| | 14 | 8.9 | weight measured (Kg) | 14.5 | 21.2 | 17.85 |
| | | | increased weight (Kg) | 5.6 | 6.7 | 6.15 |
| | | | increasing rate of weight (%) | 62.9 | 46.2 | 54.55 |
| | | | mean increased weight/day (Kg) | 0.40 | 0.48 | 0.44 |
| 0.50% | 15 | 8.6 | weight measured (Kg) | 14.5 | 21.6 | 18.05 |
| | | | increased weight (Kg) | 5.9 | 7.1 | 6.5 |
| | | | increasing rate of weight (%) | 68.6 | 49.0 | 58.8 |
| | | | mean increased weight/day (Kg) | 0.42 | 0.51 | 0.47 |
| | 16 | 9.4 | weight measured (Kg) | 15.8 | 23.5 | 19.65 |
| | | | increased weight (Kg) | 6.4 | 7.7 | 7.05 |
| | | | increasing rate of weight (%) | 68.0 | 48.7 | 58.35 |
| | | | mean increased weight/day (Kg) | 0.46 | 0.55 | 0.51 |
| 0.75% | 17 | 9.8 | weight measured (Kg) | 16.7 | 25.0 | 20.85 |
| | | | increased weight (Kg) | 6.9 | 8.3 | 7.6 |
| | | | increasing rate of weight (%) | 70.4 | 49.7 | 60.05 |
| | | | mean increased weight/day (Kg) | 0.49 | 0.59 | 0.54 |
| | 18 | 8.1 | weight measured (Kg) | 14.0 | 21.2 | 17.6 |
| | | | increased weight (Kg) | 5.9 | 7.2 | 6.55 |
| | | | increasing rate of weight (%) | 72.8 | 51.4 | 62.1 |
| | | | mean increased weight/day (Kg) | 0.42 | 0.51 | 0.47 |
| 1.00% | 19 | 9.0 | weight measured (Kg) | 15.3 | 22.9 | 19.10 |
| | | | increased weight (Kg) | 6.3 | 7.6 | 6.95 |
| | | | increasing rate of weight (%) | 70.0 | 49.7 | 59.85 |
| | | | mean increased weight/day (Kg) | 0.45 | 0.54 | 0.50 |
| | 20 | 8.8 | weight measured (Kg) | 15.1 | 22.6 | 18.85 |
| | | | increased weight (Kg) | 6.3 | 7.5 | 6.9 |
| | | | increasing rate of weight (%) | 71.6 | 49.7 | 60.65 |
| | | | mean increased weight/day (Kg) | 0.45 | 0.54 | 0.50 |
| not added (comparative sample No.5) | 21 | 9.1 | weight measured (Kg) | 14.8 | 21.6 | 18.2 |
| | | | increased weight (Kg) | 5.7 | 6.8 | 6.25 |
| | | | increasing rate of weight (%) | 62.6 | 45.9 | 54.25 |
| | | | mean increased weight/day (Kg) | 0.41 | 0.49 | 0.45 |
| | 22 | 9.1 | weight measured (Kg) | 14.9 | 21.6 | 18.25 |
| | | | increased weight (Kg) | 5.8 | 6.7 | 6.25 |
| | | | increasing rate of weight (%) | 63.7 | 45.0 | 54.35 |
| | | | mean increased weight/day (Kg) | 0.41 | 0.48 | 0.45 |
| 0.20% (comparative sample No.3) | 23 | 8.9 | weight measured (Kg) | 14.7 | 21.7 | 18.2 |
| | | | increased weight (Kg) | 5.8 | 7.0 | 6.4 |
| | | | increasing rate of weight (%) | 65.2 | 47.6 | 56.4 |
| | | | mean increased weight/day (Kg) | 0.41 | 0.50 | 0.46 |
| | 24 | 9.2 | weight measured (Kg) | 15.2 | 22.2 | 18.7 |
| | | | increased weight (Kg) | 6.0 | 7.0 | 6.5 |
| | | | increasing rate of weight (%) | 65.2 | 46.0 | 55.6 |
| | | | mean increased weight/day (Kg) | 0.43 | 0.50 | 0.47 |
| 0.50% (comparative sample No.3) | 25 | 8.1 | weight measured (Kg) | 13.4 | 19.6 | 16.5 |
| | | | increased weight (Kg) | 5.3 | 6.2 | 5.75 |
| | | | increasing rate of weight (%) | 65.4 | 46.3 | 55.85 |
| | | | mean increased weight/day (Kg) | 0.38 | 0.44 | 0.41 |
| | 26 | 9.7 | weight measured (Kg) | 15.9 | 23.3 | 19.6 |
| | | | increased weight (Kg) | 6.2 | 7.4 | 6.8 |
| | | | increasing rate of weight (%) | 63.9 | 46.5 | 55.2 |
| | | | mean increased weight/day (Kg) | 0.44 | 0.53 | 0.49 |

*percentage of the residual liquid of incubated culture broth or quantity of commercially available feed additive added to test samples or comparative samples

TABLE 5

| quantity added* | identification No. of animals | mean quantity of feeds taken | | |
|---|---|---|---|---|
| | | during 2 weeks | during 2–4 weeks | total |
| 0.25% | 13 | 0.90 | 1.01 | 26.7 |
| | 14 | 0.88 | 0.99 | 26.2 |
| 0.50% | 15 | 0.85 | 0.98 | 25.6 |
| | 16 | 0.91 | 1.01 | 26.9 |
| 0.75% | 17 | 0.92 | 1.02 | 27.2 |
| | 18 | 0.84 | 0.96 | 25.2 |
| 1.00% | 19 | 0.90 | 1.02 | 26.9 |
| | 20 | 0.87 | 1.00 | 26.2 |

TABLE 5-continued

| quantity added* | identification No. of animals | mean quantity of feeds taken | | |
|---|---|---|---|---|
| | | during 2 weeks | during 2-4 weeks | total |
| not added | 21 | 0.89 | 0.99 | 26.3 |
| (comp. sample No.5) | 22 | 0.90 | 1.00 | 26.6 |
| 0.20% | 23 | 0.89 | 1.01 | 26.6 |
| (comp. sample No.3) | 24 | 0.90 | 1.02 | 26.9 |
| 0.50% | 25 | 0.84 | 0.96 | 25.2 |
| (comp. sample No.4) | 26 | 0.93 | 1.05 | 27.7 |

*percentage of the residual liquid of incubated culture broth or quantity of commercially available feed additive added to test samples or comparative samples

TABLE 6

| quantity added* | ident. No. of animals | feed efficiency |
|---|---|---|
| 0.25% | 13 | 0.48 |
| | 14 | 0.47 |
| 0.50% | 15 | 0.51 |
| | 16 | 0.52 |
| 0.75% | 17 | 0.56 |
| | 18 | 0.52 |
| 1.00% | 19 | 0.52 |
| | 20 | 0.53 |
| not added | 21 | 0.47 |
| (comp. sample No.5) | 22 | 0.47 |
| 0.20% | 23 | 0.48 |
| (comp. sample No.3) | 24 | 0.48 |
| 0.50% | 25 | 0.46 |
| (comp. sample No.4) | 26 | 0.49 |

*percentage of the residual liquid of incubated culture broth or quantity of commercially available feed additive added to test samples or comparative samples As will be seen from Tables 4-6, shoats (identification Nos. 15-20) which were fed test samples containing 0.50 wt. %, 0.75 wt. % and 1.00 wt. % of the dried powder of residual liquid showed remarkable results in each of test items, increasing rate of weight, mean increased weights per a day and feed efficiency comparing with shoats (identification Nos. 21 and 22) which were fed assorted artificial milk feed only. It can be noted in Table 5 that total feeds taken by shoat No. 18 which was fed of the dried powder of residual liquid is smaller than those taken by shoats Nos. 21 and 22 which were not fed the residual liquid. This is because that at the beginning of the test the weight of shoat No. 18 was lower by 1.0 Kg than those of shoats Nos. 21 and 22. In fact excellent feed efficiency of the dried powder of residual liquid is observed on shoat No. 18 as shown in Table 6.

Also excellent results in test items were observed on shoats Nos. 15-20 which were fed test samples containing 0.50%-1.00% of the dried powder of residual liquid comparing with shoats Nos. 23 and 24 which were fed comparative samples containing prescribed quantitiy of commercially available feed additive containing microbial cell mass of lactic acid bacteria and to shoats Nos. 25 and 26 which were fed comparative sample containing more than twice of the prescribed quantity of commercially available feed additive containing microbial cell mass.

It will be noted that significant difference is not observed even if quantity of the commercially available feed additive is increased. Moreover, it will be apparent that the powder dried from the residual liquid is excellent than the commercially available feed additive from comparison between the results on shoats Nos. 15 and 16 which were fed test sample containing 0.50% of the dried powder of residual liquid and those on shoats Nos. 25 and 26 which were fed comparative sample containing the same parcentage of commercially available feed additive.

It will also been noted that significant difference in test items were observed between samples containing 0.50% and 0.75% of the dried powder of residual liquid, whereas significant difference was not observed between test samples containing 0.75% and 1.00% of the dried powder of residual liquid respectively. Furthermore, test sample containing 0.25% of the dried powder of residual liquid (fed to shoats Nos. 13 and 14) did not show notable effects as in the results in Test 1.

In view of the forgoings it has been concluded that when the dried powder of residual liquid of incubated culture broth of L. helveticus (NCDO No. 30) is added to feed, addition of more than 0.50% of the dried powder of residual liquid is effective and addition of 1.00% of the same is the upper limit.

Similar results were observed when a mixture of the dried powder of residual liquid of the incubated culture broth of Bifidobacteria and the dried powder of residual liquid of the incubated culture broth of lactic acid bacteria were added to feed in the ratio of more than 0.50%. It has also been confirmed that the dried powder of residual liquid of the incubated culture broth is effective not only for shoats but also matured fertilizable swine.

Almost same results were observed in similar tests which were carried out using different species of Bifidobacteria and lactic acid bacteria.

It will be understood that the composition of feedstuff of this invention achieves excellent results in increasing rate of weight, increased weight per a day and feed efficiency and is preferred by various animals irrespective of kind and age of animals. Also the composition of feedstuff of this invention is well suited to feed together with antibiotics, since living or viable microbial cell mass is not contained. Economical significance of the present invention is greate since the residual liquid of incubated culture broth used in this invention can be obtained as the waste by-product in large scale cultivation of Bifidobacteria and/or lactic acid bacteria and is rich in useful metabolic substanses.

Now some examples will be described hereunder for better understanding of the present invention.

EXAMPLE 1

Using 5,000 Kg of the culture medium used in Test 2, strain of Streptococcus feacalis (IAM No. 1262) was incubated at 38° C. for 18 hours, then acidity of the incubated culture medium was adjusted to pH 6.9 with 30% aqueous solution of sodium hydroxide. Microbial cell mass was substantially removed supplying the incubated culture broth into MRPX-type centrifuge (by Alfa Laval) at the velocity of 2,500 Kg per hour to obtain 4,900 Kg of the supernatant fluid containing solid content of 5.0 wt. %. Adding 10 Kg of the resulted liquid to 100 Kg of commercially available assorted feed for matured swine, 109 Kg of feedstuff composition of this invention was obtained. The composition of the commercially available assorted feed was as follows:

| Composition of Assorted Feed | |
| --- | --- |
| corn (maiz) | 34.7% |
| milo | 30.0% |
| soya bean cake | 9.0% |
| fish meat powder | 5.0% |
| wheat bran | 10.0% |
| Alfalfa meal | 6.0% |
| molasses | 3.0% |
| calcium phosphate, tribasic | 1.1% |
| calcium carbonate | 0.4% |
| salt | 0.4% |
| mixture of vitamins | 0.2% |
| mixture of minerals | 0.2% |
| in total | 100.0% |

EXAMPLE 2

Using 1,000 Kg of the culture medium used in Test 1, strain of *Bifidobacterium longum* (ATCC No. 15708) was incubated at 40° C. for 18 hours, then acidity of the incubated culture broth was adjusted to pH 7.0 with 30% aqueous solution of sodium hydroxide. Microbial cell mass was substantially removed by supplying the incubated culture broth into sharples type centrifuge to obtain 950 Kg of the residual liquid containing solid content of 6.0 wt. %. Adding 45 Kg of dextrine powder containing 10 wt. % moisture to 475 Kg of the resulted liquid, the resulted mixture was dried using a spray dryer (by ANHYDRO) at 60° C. to obtain 65 Kg of powder containing more than 41 wt. % in solid content of the incubated culture broth excluding microbial cell mass. Adding 18 Kg of the resulted powder to 1,000 Kg of commercially available feed for eel, 1,009 Kg of feedstuff for eel containing more than 0.72% of the residual liquid in solid content was obtained. The composition of the commercially available feed for eel was as follows:

| Composition of Feed for Eel | |
| --- | --- |
| fish meat powder | 63.0% |
| wheat gluten | 5.0% |
| dried beer yeast | 6.0% |
| wheat flour | 22.4% |
| mixture of vitamins | 1.0% |
| 50% choline chloride | 0.3% |
| mixture of minerals | 2.3% |
| in total | 100.0% |

EXAMPLE 3

Using 500 Kg of the culture medium of the composition listed hereunder, strain of *Lactobacillus plantarum* (LP No. 83) isolated from silage was incubated at 37° C. for 20 hours.

| Composition of Culture Medium | |
| --- | --- |
| yeast extract | 1.0% |
| peptone | 1.5% |
| casein hydrolysate | 1.5% |
| glucose | 3.0% |

| -continued | |
| --- | --- |
| Composition of Culture Medium | |
| potassium phosphate | 0.2% |
| potassium phosphate, dibasic | 0.2% |
| magnesium chloride | 0.2% |
| mangan chloride | 0.3% |
| cystine | 0.04% |

Microbial cell mass was substantially excluded from the incubated culture broth as in Example 2 to obtain 480 Kg of the supernatant fluid containing 5.6 wt. % of solid content. Subjecting 360 Kg of the liquid to freeze drying using an RL-type vacuum freeze dryer (by KYOWA) at 0.5 Torr, about 20 Kg of its powder was obtained.

On the other hand 360 Kg of the residual liquid of the incubated culture broth obtained in Example 2 was freeze dried in the same way as mentioned above, about 20 Kg of the powder of residual liquid of incubated culture broth of *B. longum* (ASTCC No. 15708) was obtained. Same quantities of the resulted powders were mixed, and 8.0 Kg of the resulted powder mixture was homogeneously mixed with 1,000 Kg of pet food of the composition listed hereunder to thereby obtained about 1,008 Kg of composition of pet food containing 0.8 wt. % in solid content of the residual liquid of incubated culture broth of Bifidobacteria and lactic acid bacteria.

| Composition of Petfood | |
| --- | --- |
| meat powder | 8.0% |
| fish meat powder | 5.0% |
| corn (maiz) | 5.0% |
| soya bean cake | 12.0% |
| wheat germ | 8.0% |
| wheat | 51.23% |
| skim milk | 4.0% |
| tallow | 2.0% |
| dried beer yeast | 2.0% |
| powdered bones | 2.0% |
| salt | 0.5% |
| mixture of vitamins and minerals | 0.27% |
| in total | 100.0% |

The compositions of feedstuff obtained in Examples 1-3 were found to be effective for promoting animal growth to the same extent as shown in Tests 1 and 2.

We claim:

1. A feedstuff composition containing at least 0.50 wt. % in solid content of a residual liquid of an incubated culture broth of Bifidobacteria, lactic acid bacteria, or both, which residual liquid is obtained by substantially excluding the microbial cell mass from said incubated culture broth.

2. The feedstuff composition as set forth in claim 1, wherein said residual liquid is present in a ratio ranging from 0.5 wt. % to 1.0 wt. % in solid content.

3. The feedstuff composition as set forth in claim 1 or 2, wherein said residual liquid is contained in a form selected from the group consisting of (i) supernatant fluid of an incubated culture obtained by excluding the microbial cell mass therefrom, (ii) concentrated liquid of the supernatant fluid, and (iii) solid material obtained by removing water from the supernatant fluid.

4. The feedstuff composition of claim 1, wherein said feedstuff is suitable for feeding to mammals or fish.

5. The feedstuff composition of claim 1, wherein said feedstuff is suitable for feeding to cattle, swine, chickens, eels, cats or dogs.

6. The feedstuff composition of claim 3, comprising said supernatant fluid of an incubated culture obtained by excluding the microbial cell mass therefrom.

7. The feedstuff composition of claim 3, comprising said concentrated liquid of the supernatant fluid.

8. The feedstuff composition of claim 3, comprising said solid material obtained by removing water from the supernatant fluid.

9. A feedstuff composition containing at least 0.50 wt. % in solid content of a residual liquid of an incubated culture broth of Bifidobacteria, lactic acid bacteria, or both, wherein said residual liquid is substantially free of the Bifidobacteria and lactic acid bacteria of said culture broth, and said culture broth is, prior to said incubation, synthetic or semi-synthetic.

10. A feedstuff composition obtained by:
 (i) incubating a culture broth containing Bifidobacteria, lactic acid bacteria, or both;
 (ii) obtaining a residual liquid from said incubated culture broth by substantially excluding the microbial cell mass from said incubated culture broth; and
 (iii) adding to a feedstuff composition, in an amount corresponding to at least 0.50 wt. % in solid content of said composition, said residual liquid.

11. The feedstuff composition of claim 1, wherein said Bifidobacteria is *B. bifidum, B. longum*, or *B. pseudolongum*.

12. The feedstuff composition of claim 1, wherein said incubated culture broth contains a microorganism belonging to the genus Lactobacillus.

13. The feedstuff composition of claim 12, wherein said microorganism is *L. bulugaricus, L. casei*, or *L. acidophilus*.

14. The feedstuff composition of claim 1, wherein said lactic acid bacteria is Streptococcus, Pediococcus, or Leuconostoc.

15. The feedstuff composition of claim 10, wherein said culture broth is synthetic or semi-synthetic.

* * * * *